Sept 10, 1957 S. BOHENEK 2,805,882
WHEEL LIFTER
Filed Nov. 27, 1953

INVENTOR.
STEVEN BOHENEK,
BY
McMorrow, Berman & Davidson
ATTORNEYS

United States Patent Office 2,805,882
Patented Sept. 10, 1957

2,805,882

WHEEL LIFTER

Steven Bohenek, Wallington, N. J.

Application November 27, 1953, Serial No. 394,717

1 Claim. (Cl. 294—15)

This invention relates to implements for handling motor vehicle wheels, and more particularly to an improved implement for handling a motor vehicle wheel, as for removing a wheel from a motor vehicle and replacing the same with the motor vehicle spare wheel.

The main object of the invention is to provide an efficient and practical motor vehicle wheel handling implement which is simple in construction, which is easy to interengage with a motor vehicle wheel, and which is arranged so that the wheel may be readily lifted and handled by means of the implement.

A further object of the invention is to provide an improved motor vehicle wheel handling implement which is inexpensive to manufacture, which is durable in construction, and which is lockingly engageable in the arcuate rim slot of a motor vehicle wheel to enable the wheel to be easily lifted and carried by the user without requiring the user to grasp the peripheral surface of the wheel tire, as is ordinarily required in handling a motor vehicle wheel.

Further objects and advantages of the invention will become apparent from the following description, and from the accompanying drawings, wherein.

Figure 3:
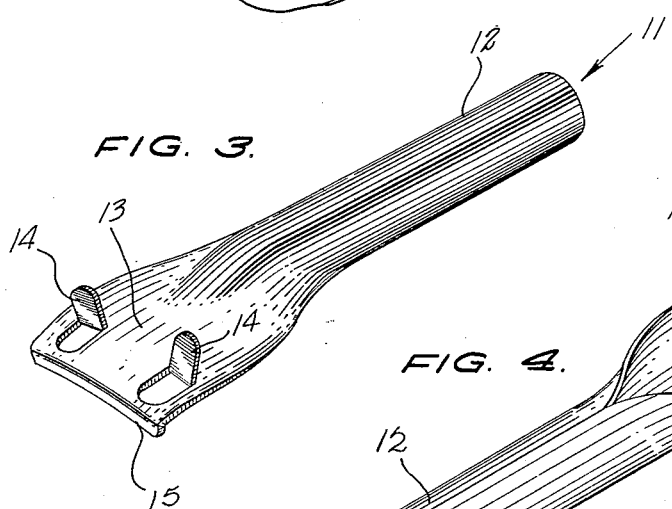
Figure 3 is an enlarged top perspective view of the wheel handling implement employed in Figures 1 and 2.
Figure 4:
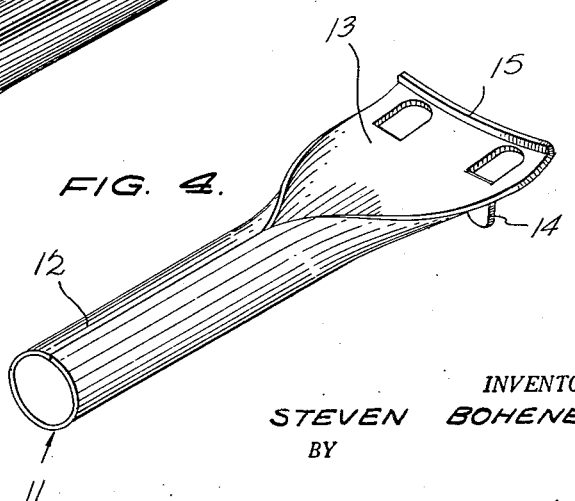
Figure 4 is a bottom perspective view of the wheel handling implement of Figures 1, 2 and 3.

Referring to the drawings, the illustrated implement, designated generally 11, comprises a rigid tubular handle 12, formed, for example, from a piece of sheet metal of substantial width rolled to define the tubular handle 12 and a substantially flat forward portion 13 to define a head which is substantially wider than the rolled handle 12, as is clearly shown in Figures 3 and 4. The flat head 13 is formed along its forward free edge with a depending flange 15 and is further formed with a pair of laterally spaced upstruck lugs 14, 14 which are spaced inwardly at equal distances from the flange 15 as is clearly shown in Figure 3. The lugs 14, 14 are spaced apart a substantial distance, and as illustrated, may be located adjacent the respective side edges of the head 13.

Figure 1:
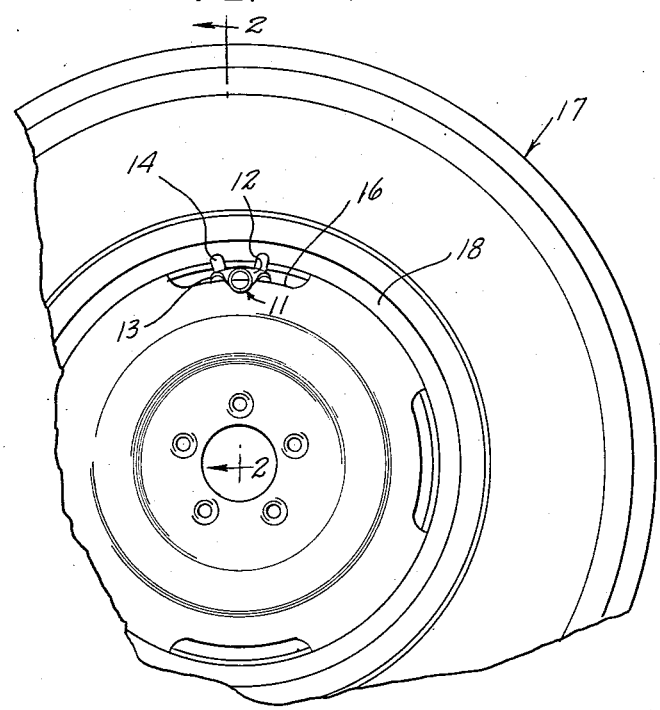
Figure 1 is a fragmentary side elevational view of a motor vehicle wheel showing the manner in which an improved wheel handling implement according to the present invention is engaged in an arcuate slot of the wheel.
Figure 2:
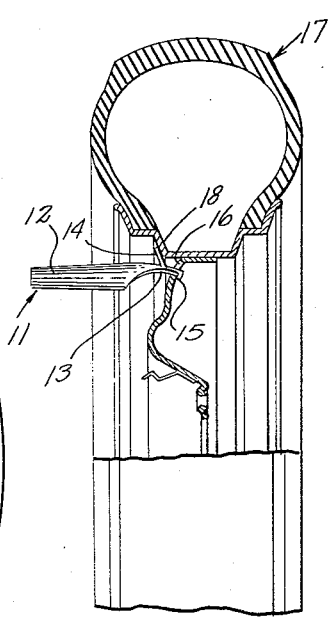
Figure 2 is a fragmentary vertical cross sectional view taken on the line 2—2 of Figure 1.

In using the implement 11 to lift and carry a vehicle wheel, the forward edge of the head 13 is inserted in one of the arcuate slots 16 of the wheel, for example, in the uppermost arcuate slot, as shown in Figure 1, with the flange 15 hooked behind the lower edge of the slot 16, and the lugs 14 against the wheel rim 18 in the manner shown in Figure 2. The vehicle wheel, shown at 17, may then be lifted by exerting an upward force on the handle 12. After the wheel has been moved to a desired position, and has been secured in said position, or has been deposited on any suitable support, the implement may be disengaged from the wheel by swinging the handle 12 downwardly so as to withdraw the forward end of the head and the flange 15 from the wheel slot 16.

As is clearly shown in Figures 3 and 4, the head 13 may be slightly curved arcuately both transversely and longitudinally, the transverse curvature being substantially the same as the curvature of the arcuate wheel slot 16, to facilitate the engagement of the head 13 in the slot in the manner described above.

It will be understood, that as employed above, the term "substantially flat" is used to distinguish from the tubular configuration of the handle portion 12. Obviously, the head 13 can, if so desired, be either flat or slightly curved, within the spirit of the present invention.

While a specific embodiment of an improved motor vehicle wheel handling implement has been disclosed herein, it will be understood that various modifications within the spirit of the invention may occur to those skilled in the art. Therefore, it is intended that no limitations be placed on the invention except as defined by the scope of the appended claims.

What is claimed is:

In a lifter for a vehicle wheel having a rim and an arcuate wheel slot adjacent to the rim, a rigid handle having a forward end, a substantially flat head fixed on and extending longitudinally from the forward end of said handle, said head being adapted to be extended through the arcuate wheel slot, a lateral flange extending downwardly in a vertical direction completely across the front edge of the head adapted to engage behind the wheel, and at least one lug extending upwardly in a vertical direction from the head, said lug being spaced inwardly of said flange to engage the wheel rim while the head is extended through the arcuate wheel slot and the flange engaged behind the wheel.

References Cited in the file of this patent

UNITED STATES PATENTS

| | | |
|---|---|---|
| 2,547,474 | Munyon | Apr. 3, 1951 |
| 2,569,242 | Kors | Sept. 25, 1951 |
| 2,639,934 | Swinamer | May 26, 1953 |